United States Patent [19]
Martinez et al.

[11] Patent Number: 5,226,114
[45] Date of Patent: Jul. 6, 1993

[54] TELEVISION PICTURES

[75] Inventors: Dennis M. Martinez, Dedham; Jae S. Lim, Winchester, both of Mass.

[73] Assignee: Massachusetts Institute of Technology, Cambridge, Mass.

[21] Appl. No.: 842,779

[22] Filed: Feb. 25, 1992

Related U.S. Application Data

[63] Continuation of Ser. No. 421,152, Oct. 13, 1989, abandoned.

[51] Int. Cl.⁵ .................................................. G06F 3/14
[52] U.S. Cl. .................................... 395/128; 395/164; 358/428; 358/448
[58] Field of Search .................. 340/747, 750, 728; 358/448, 449, 451, 452, 453, 426, 428; 395/164, 165, 166, 128, 129

[56] References Cited

U.S. PATENT DOCUMENTS

| | | | |
|---|---|---|---|
| 4,838,685 | 6/1989 | Martinez et al. | 352/85 |
| 4,862,150 | 8/1989 | Katsura et al. | 340/703 |
| 4,866,520 | 9/1989 | Nomura et al. | 358/140 |
| 4,931,784 | 6/1990 | Easterbrook | 340/728 |
| 5,001,651 | 3/1991 | Rehme et al. | 364/518 |
| 5,058,041 | 10/1991 | Rose et al. | 395/164 |
| 5,077,610 | 12/1991 | Searby et al. | 358/183 |

OTHER PUBLICATIONS

"Picture Coding: A Review", Proceedings of the IEE pp. 366-406 (Mar. 1980).
Two Dimensional Signal and Image Processing, (1990), Prentice Hall, pp. 513-515, 577-580, 671-673.
Roizen et al., "A Progress Report on Improved NTSC" (SMPTE J., vol. 98, pp. 817-822, Nov. 1989).
Roizen et al., "Improving NTSC to Achieve Near-RGB Performance" (SMPTE J., vol. 96, pp. 750-761, Aug. 1987).

*Primary Examiner*—Phu K. Nguyen
*Attorney, Agent, or Firm*—Fish & Richardson

[57] ABSTRACT

An apparatus for processing an image containing a plurality of original lines of pixels to generate one or more intermediate lines of pixels lying intermediate the original lines includes means for storing the original lines of pixels, means for estimating line shift velocities for pixels along the intermediate lines where the velocities are derived from surrounding pixels on the original lines, means for using the estimated line shift velocities to access the addressable memory and shift pixels from the original lines, means for generating the characteristics of pixels along the intermediate lines from the characteristics of the pixels shifted by the line shift velocities, and means for displaying or storing the generated characteristics of pixels along the intermediate lines.

27 Claims, 2 Drawing Sheets

TELEVISION PICTURES

The U.S. Government has non-exclusive rights in this invention pursuant to Grant Number MIP-8714969 awarded by The National Science Foundation.

This is a continuation of application Ser. No. 07/421,152, filed Oct. 13, 1989, now abandoned.

The present invention relates to improving television pictures.

Most widely used television standards incorporate 2-to-1 interlaced sampling, in which each frame is decomposed into two fields. A first field is raster scanned in horizontal lines across the screen. A second field is scanned in a like manner but offset so as to interlace with the first field. The lines each typically contain several hundred pixels. This sampling method is used in order to provide minimal flicker for a given signal bandwidth. A field is typically scanned once every one-sixtieth of a second.

There are many applications where one desires to display a single frame of a television image, such as in freeze frame displays, or for photographic capture of a television image. Another related application is to convert interlaced video signals into progressively scanned video signals in order to enhance the vertical resolution by "line doubling". The same approach can be used to improve the horizontal resolution by "column doubling". If there is any significant motion of the objects within a frame, combining the two fields directly to form the frame causes significant blurring. Consequently, the most widely used interpolation approach is to repeat each line of a field to produce a frame with the proper aspect ratio (zero order interpolation). Another approach is to average adjacent lines in one field to produce the lines in the other field (first order interpolation).

According to the invention, a second field is interpolated from a first field of an interlaced frame for higher resolution freeze frame displays or for improved resolution television sets. Preferably small segments of adjacent raster scan lines of a given field are assumed to be related by a spatially varying line shift velocity vector, using motion estimation to interpolate the second field, pixel-by-pixel.

Corresponding known pixels on adjacent lines of a pair shift slightly at a velocity having a horizontal (or vertical) component along the line that may be conveniently estimated according to the invention to establish an estimated vector velocity therebetween. It has been discovered that the corresponding estimated pixel on the intermediate line therebetween may be conveniently located midway between the two corresponding known pixels with estimated characteristics, such as intensity, saturation and hue, midway between corresponding characteristics of the corresponding known pixels, closely representing the actual pixel on the intermediate line. The estimated velocity is typically representative of the horizontal separation between feature portions, such as an image edge, sampled on the pair of adjacent lines.

In one aspect of the invention, an apparatus for spatial interpolation of an intermediate set of points, from a pair of sets of points, includes a selector circuit for selecting sample points from the sets of points, an interpolating circuit for interpolating location of the intermediate set of points and coupled to the selector unit, an estimating circuit for estimating signal parameters in view of the selected sample points and coupled to the selector circuit, a velocity circuit for estimating line shift velocity in view of the estimated signal parameters and coupled both to the estimating circuit and the interpolating circuit, and whereby the interpolating circuit provides location signals representative of the location of points to form the intermediate set of points based on the line shift velocity estimated by the velocity circuit and the selected sample points selected by the selector circuit.

This aspect may include the following features: The selector circuit may include a random access memory. The estimating circuit may include a plurality of finite impulse response (FIR) filters coupled in parallel, such as five filters. The estimating circuit may include a processor capable of vector, matrix, vector multiply and divide functions. The interpolating circuit may include an averaging circuit.

In another aspect of the invention, a method for spatial interpolation of an intermediate line of points, from a given pair of lines of points, includes the steps of selecting a sample of points from the given pair of lines to provide a sample vector, processing the sample vector to provide estimated signal parameters, processing the estimated signal parameters to provide an estimated line shift velocity signal representative of the relative shift velocity between the pair of lines of points, and processing the velocity signal and the sample vector to generate an interpolation signal representative of the location of the points of the intermediate line based on the estimated line shift velocity and the selected sample of points.

This aspect may include the following features: Selecting a sample vector may include the steps of generating addresses within a frame store and reading corresponding pixel values. Estimating signal parameters may include the steps of matrix/vector multiplications with a fixed matrix and the sample vector. Estimating line shift velocity may include the steps of evaluating two matrix quadratic forms and dividing the results. Interpolating the location of the points may include, for a given point to be determined, the steps of correlating the estimated velocity to a velocity vector, mapping the vector onto the given pair of lines at respective points on the lines, adding the value of the estimated velocity to the lower of the respective mapped points to extract a first value and subtracting the value of the estimated velocity from the upper of the respective mapped points to extract a second value, and averaging the first and second values to obtain the location of the given point to be determined.

In another aspect of the invention, a method for spatial interpolation of an intermediate line of points, from a given pair of lines of points, includes the steps of (a) estimating the line shift velocity from parameters derived from image samples from a window surrounding a point of interest, and (b) projecting the velocity estimate onto two field lines adjacent to the location of the sought point of interest, and (c) averaging the image intensities at the corresponding points of interest to generate an interpolated point. This aspect may feature iteratively repeating the steps to generate an interpolated line of points.

In another aspect of the invention, an apparatus for spatial interpolation of sought points of an intermediate line of points, from a pair of lines of points which bracket the intermediate line of points, includes a memory for storage of the respective addresses of the points of the given pair from which the address of each of the sought points is to be interpolated, a filter arrangement for estimating respective signal parameters from a window of samples surrounding each of the sought points, a product finding arrangement for determining the numerator and denominator in equation (11) below relative to each of the sought points based upon respective signal parameters estimated by the filter arrangement, a processor arrangement for determining the line shift velocity for each sought point based upon a respective numerator and denominator determined by the product finding arrangement, a memory selector arrangement for providing, based upon the line shift velocity determined by the processor arrangement, the addresses of a respective set of points, from the given pair, the set of points bracketing a given one of the sought points, and an averaging circuit for determining the address of the given sought point by interpolating between the addresses of the respective set, whereby the sought points of the intermediate line can be interpolated.

This aspect may include the following features: The filter arrangement may include five, two-dimensional filters. The memory may be a two-line memory. The impulse response of each of the filters may correspond to the entries of the matrix $(A^T A)^{-1} A^T$ in equation (7) below. The product finding arrangement may be a double quadratic product circuit. The coefficients of the quadratic forms may be given by the matrices in equations (12) and (13) below. The processor arrangement may be a divide circuit.

Other advantages and features will become apparent from the following description when read in connection with the accompanying drawings in which.

Figure 1:
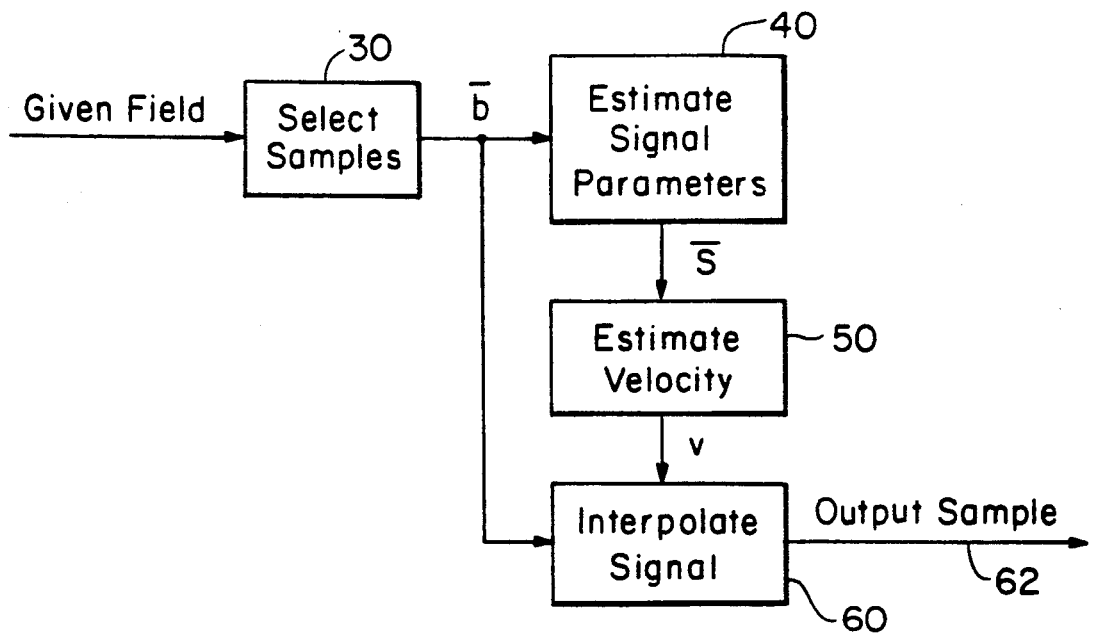
FIG. 1 is a block diagram of an interpolation system according to the invention.

Referring to FIG. 1, for a selected field in a given frame, a sample selector circuit 30 generates sample vector $\bar{b}$ containing a number (preferably seven) nearest pixels on a first line and the same number of nearest pixels on a second line next to the first line. It is in between these lines that the new field line is to be generated. This sample is applied both to a signal parameter estimation circuit 40 and to a first input of signal interpolator circuit 60. The estimated signal parameters $\bar{S}$ from estimator circuit 40 are applied to a line shift velocity estimator circuit 50, whose output v is applied to a second input of signal interpolator 60. The sample vector $\bar{b}$ and the estimated line shift velocity v are used by interpolator 60 to generate output sample 62 for generation or reconstruction of a given pixel in the missing field. Hence, the missing field can be generated line-by-line, pixel-by-pixel, based upon the pixel sample values from a given field of an interlaced frame.

In an alternative embodiment, the same procedure can be applied along the columns of a digitized image to enhance horizontal resolution.

Figure 2:
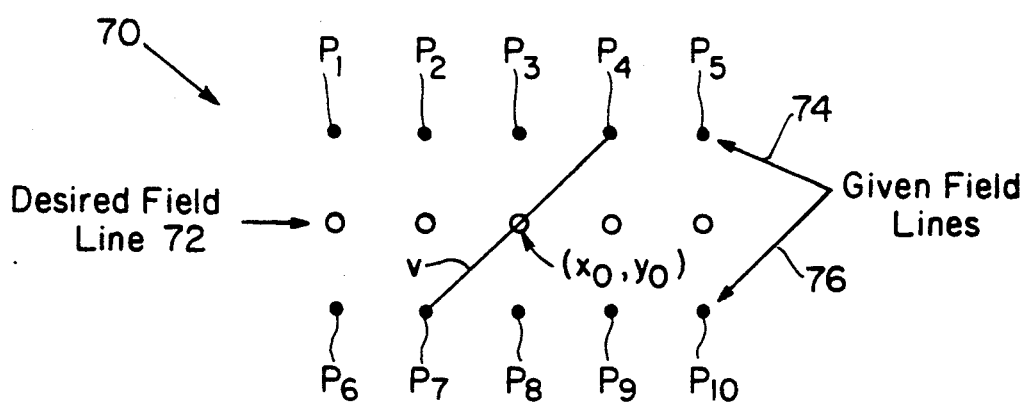
FIG. 2 depicts portions of an image in a single frame.

Referring to FIG. 2 there is shown a line shift model applied to a window sample 70 which illustrates the operations performed at each output pixel location to be generated. Five pixels $P_1$–$P_5$ are shown on scan line 74 and five pixels $P_6$–$P_{10}$ are shown on an adjacent line 76 in window sample 70.

Let s(x,y) denote the intensity of a frame in a television image. (If the image is in color, s(x,y) is the luminance component, which is computed from the red, green, and blue components by a linear transformation.) Now consider the small window sample 70 of the frame image, which is centered about the pixel or point $(x_0, y_0)$; this sample pixel $(x_0, y_0)$ lies on an imaginary line 72 which is sought to be determined from and interlaced between field lines 74, 76. If the window sample 70 is sufficiently small, adjacent lines of the frame are approximately related by a simple relative horizontal shift around pixel $(x_0, y_0)$ for a momentarily fixed line shift velocity v.

It is convenient to characterize this horizontal shift by a horizontal velocity v, in units of pixels/line. Based on this reasoning, the relation between adjacent lines of a frame is as follows:

$$s(x,y) = s_0(x - v(y - y_0)) \tag{1}$$

In this expression, $s_0(x)$ is the pixel image intensity along the missing scan line 72 being determined. If the first order partial derivatives of s(x,y) exist, this can be written in the following form:

$$v \frac{\partial s}{\partial x} + \frac{\partial s}{\partial y} = 0 \tag{2}$$

The reconstruction process is based on equation (2). It proceeds in two basic steps. First, an estimation is made of the line shift velocity, v, obtained from parameters $\bar{S}$ derived from image samples $\bar{b}$ from window 70 surrounding the pixel (or point) of interest $(x_0, y_0)$. (For color pictures, this operation is preferably carried out only on the luminance component.)

In the next step, the velocity estimate v is projected onto the two field lines 74, 76 adjacent to (above and below) the location of the sought pixel at $(x_0, y_0)$, and the image intensities at the corresponding points (e.g., at $P_4$, line 74 and $P_7$, line 76, in FIG. 2) are averaged together. More particularly, the end points $P_4$, $P_7$ of vector v are determined, where the value of v is added to bottom point ($P_7$) and subtracted from upper point ($P_4$). These resulting values are then averaged to determine the value of the pixel of interest (at $x_0, y_0$). In practice, it is often adequate to quantize the velocity to the nearest integer number of pixels per line. This process continues until all pixels on a line to be generated and all lines to be generated are generated. Hence a higher resolution frame can be displayed. (For color pictures, this operation takes place on each component color, red, green, and blue; for enhanced resolution television pictures this process is performed on all fields.)

Line shift velocity may be estimated with at least two techniques. A first technique involves shifting windowed line segments and computing the displacement which maximizes the correlation. However, a preferred technique for estimation of line shift velocity is based on a least squares estimation procedure applied to equation (2).

In particular, it is possible to evaluate the partial derivatives of the image at a set of N points, $P_i$ for $i = 1 \ldots N$, which surround the point at which the velocity is to be estimated (e.g., pixels $P_1$–$P_{10}$, FIG. 2). A least squares estimate for v is obtained from the equation $$\min_v \left\{ \sum_{i=1}^{N} \left( v \frac{\partial s}{\partial x} \bigg|_{P_i} + \frac{\partial s}{\partial y} \bigg|_{P_i} \right)^2 \right\} \tag{3}$$

A solution to this equation is $$v = \frac{-\sum_{i=1}^{N}\left(\frac{\partial s}{\partial x}\bigg|_{P_i}\right)\left(\frac{\partial s}{\partial y}\bigg|_{P_i}\right)}{\sum_{i=1}^{N}\left(\frac{\partial s}{\partial x}\bigg|_{P_i}\right)^2}$$

This technique enables determination of the horizontal component of the line shift velocity (while the vertical component is known as the vertical distance between lines 74, 76). However, when the gradient of the image along the x (horizontal) direction is zero, an estimate based upon equation (4) is indeterminate because the denominator becomes zero. In this case a zero velocity is assumed.

An approach for determining line shift velocity estimates based on equation (4) involves determining the image gradients at the set of points in the vicinity of the point of interest $(x_0, y_0)$. A preferred method for estimation of image gradients is based on a parametric image model, preferably with a linear relationship between the parameters and the signal. This model is applied only to small regions of the image around the point of interest. The following expression summarizes the model $$s(x,y) \approx \bar{s}(x,y) = \sum_{j=1}^{P} S_j \phi_j(x,y) \tag{5}$$

The functions $\phi_j(x,y)$ for $j = 1 \ldots P$, are two-dimensional basis functions that may be selected, and $\{S_j\}$ are the model parameters.

The samples in the given field are used to estimate the model parameters $\{S_j\}$. The gradients are determined by differentiating $\bar{s}(x,y)$. In order to improve the desired signal in the presence of noise, it is preferable to use an overdetermined signal model. Hence, each small region 70 consists of more points $P_1$–$P_N$, than the number of model parameters $\{S_j\}$; i.e., there are more signal samples than model parameters.

In a preferred embodiment, it is desirable to generate sample $\bar{b}$ with seven sample points per line, and determine five parameters in estimator circuit 40 using simple matrix/vector multiplications. These five outputs $\bar{S}$ are applied to velocity estimator 50 where velocity is estimated by simple divide and matrix/vector multiplications. The velocity estimate signal is combined with sample $\bar{b}$ in a simple pipelined multiply accumulate operation performed by interpolation circuit 60.

If the model is used directly for interpolation purposes, objectionable blurring may result. Hence, this signal model is preferably used only for the purpose of velocity estimation; the actual interpolation process uses the image samples $\bar{b}$ directly in conjunction with the respective estimated velocity signals v to interpolate the desired pixel of line 72.

For each point where the velocity is to be estimated, a window of M samples is extracted from the two lines of a given field to estimate the signal parameters. In actual experiments, a grid of seven samples in each of the two lines resulted in a total of 14 samples (M=14). In order for estimator 40 to determine the signal parameters, it is desirable to minimize the squared error between the model and the given samples. Since the model is linear in regard to these parameters, they may be estimated by solving the following set of linear equations:

$$\min_{\{S_j\}} \left\{ \sum_{k=1}^{M} \left( s(x_k, y_k) - \sum_{j=1}^{P} S_j \phi_j(x_k, y_k) \right)^2 \right\} \tag{6}$$

The solution to this equation is $$S = (A^T A)^{-1} A^T b \tag{7}$$

where $$A = \begin{bmatrix} \phi_1(x_1,y_1) & \cdots & \phi_p(x_1,y_1) \\ \vdots & & \vdots \\ \phi_1(x_m,y_m) & \cdots & \phi_p(x_m,y_m) \end{bmatrix} \tag{8}$$

$$b = \begin{bmatrix} s(x_1,y_1) \\ \vdots \\ s(x_m,y_m) \end{bmatrix} \text{ and } S = \begin{bmatrix} S_1 \\ \vdots \\ S_p \end{bmatrix} \tag{9}$$

A set of two-dimensional second order algebraic polynomials is used as the basis functions (P=5):

$$\begin{aligned}
\phi_1(x,y) &= 1 \\
\phi_2(x,y) &= x \\
\phi_3(x,y) &= y \\
\phi_4(x,y) &= x^2 \\
\phi_5(x,y) &= xy
\end{aligned} \tag{10}$$

Considering the following factors is helpful in selection of the basis functions: very small regions of the image are being modeled; the model is overdetermined and an exact representation is not sought, which is important when there is noise in the images; the model is used only to estimate the gradients of the image; since the samples are restricted to small regions, polynomials are a good choice of functions to use.

Once the parameters $\{S_j\}$ have been estimated, equation (4) is reduced to $$v = \frac{-S^T(G_x^T G_y)S}{|G_x S|^2} \tag{11}$$

where $$G_x = \begin{bmatrix} \frac{\partial \phi_1}{\partial x}\bigg|_{P_1} & \cdots & \frac{\partial \phi_p}{\partial x}\bigg|_{P_1} \\ \vdots & & \vdots \\ \frac{\partial \phi_1}{\partial x}\bigg|_{P_n} & \cdots & \frac{\partial \phi_p}{\partial x}\bigg|_{P_n} \end{bmatrix} \tag{12}$$

$$G_y = \begin{bmatrix} \frac{\partial \phi_1}{\partial y}\bigg|_{P_1} & \cdots & \frac{\partial \phi_p}{\partial y}\bigg|_{P_1} \\ \vdots & & \vdots \\ \frac{\partial \phi_1}{\partial y}\bigg|_{P_n} & \cdots & \frac{\partial \phi_p}{\partial y}\bigg|_{P_n} \end{bmatrix} \qquad (13)$$

It is a benefit of the present invention that v may be determined with a divide and matrix/vector multiplications, and $\bar{S}$ may be determined from the image samples with a matrix/vector multiplication. The matrices depend only on the basis functions and the sampling instants, not on the image samples. Therefore, these matrices may be determined offline. The system is therefore well structured and computationally efficient.

It is noted that N in equation (4) and M in equation (6) are independent. In order to estimate line shift velocity, image gradients at N pixels in the sample are determined. In order to estimate image gradients, a parametric model based on M signal samples is generated. A large N results in averaging many gradient estimates, and a large M results in averaging many signal samples to estimate the signal parameters. In a specific implementation $N = M = 14$.

Figure 3:
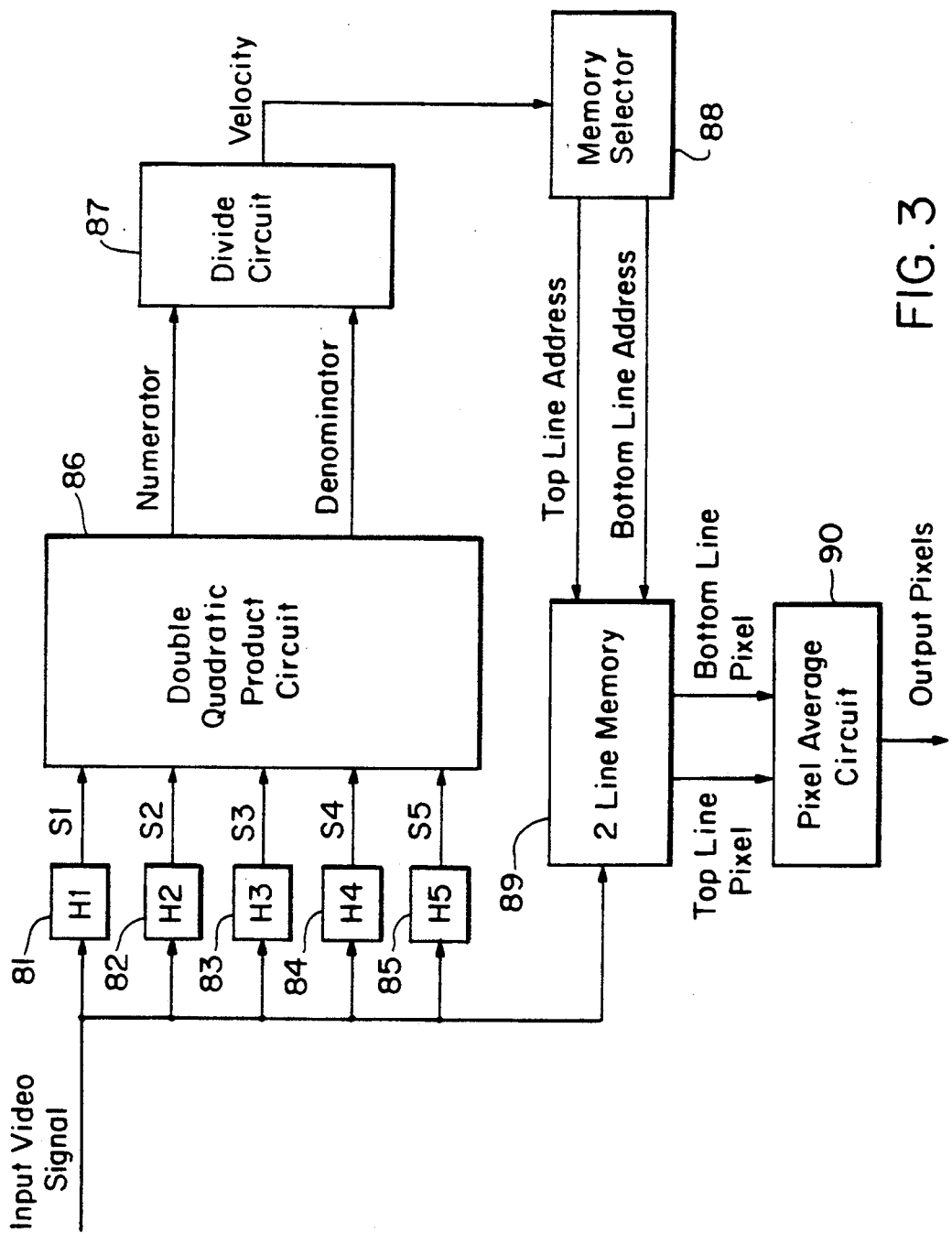
FIG. 3 illustrates an apparatus of the invention.

Turning now to FIG. 3, in a preferred embodiment, a video signal is simultaneously input to five two-dimensional filters 81-85 and to a two-line memory 89. Each filter provides one of the signal parameters, S1-S5, for each output pixel. The impulse response of each of the filters corresponds to the entries of the matrix $(A^T A)^{-1} A^T$ in equation (7). A double quadratic product circuit 86 provides signals representative of the numerator and denominator terms of equation (11). The coefficients of the quadratic forms are given by the matrices in equations (12) and (13). A divide circuit 87 provides signals representative of the line shift velocity for each output pixel. The velocity signals are input to a memory selector circuit 88 which generates address signals for the top line pixel and the bottom line pixel within the two-line memory 89. The two pixels are read out of the memory and averaged by a pixel average circuit 90 to produce the final output pixel. This entire process occurs in a pipelined fashion to generate an output video signal.

The present invention was tested on a variety of images with improved results. Favorable comparisons were made between frames generated with the invention and with zero and first order interpolation systems. Both black and white, and color images were used in the experiments. These images were obtained from a variety of sources, including digitizing NTSC television signals off the air. Frames generated according to the invention were superior, even under very low signal-to-noise ratios.

Other embodiments are within the following claims.

What is claimed is:

1. A method of electronically processing a television signal image containing a plurality of original lines of pixels to generate one or more intermediate lines of pixels lying intermediate said original lines, said method comprising the steps of:

(a) storing said original lines of pixels in an addressable memory,
    (b) estimating line shift velocities for pixels along said intermediate lines, the velocities being derived from surrounding pixels on said original lines,
    (c) using said estimated line shift velocities to access the addressable memory and shift pixels from said original lines,
    (d) generating the characteristics of pixels along said intermediate lines from the characteristics of said pixels shifted by said line shift velocities, and
    (e) displaying or storing said original and intermediate lines of pixels.

2. The method of claim 1 wherein said characteristics include intensity.

3. The method of claim 2 wherein step (d) includes for each said pixel along a said intermediate line averaging the intensities of at least two said pixels shifted by said line shift velocities from original lines surrounding said intermediate line.

4. The method of claim 1 wherein said image is a color television image, and said characteristics include luminance and chrominance components.

5. The method of claim 4 wherein said estimated line shift velocities are derived from luminance and not chrominance values.

6. The method of claim 1 wherein said line shift velocities for said intermediate line are based only on pixels in adjacent original lines.

7. The method of claim 6 wherein the pixels in adjacent original lines are those in a segment surrounding the pixel on the intermediate line for which a said line shift velocity is being determined.

8. The method of claim 1 wherein the estimated line shift velocity is representative of the separation of an image feature along the direction of the lines.

9. The method of claim 1 wherein said image is a television image.

10. The method of claim 1 wherein said estimating step includes the use of finite impulse response (FIR) filters in parallel.

11. The method of claim 1 wherein an intermediate step is performed in estimating the line shift velocities, the intermediate step includes matrix/vector transposition, inversion, and multiplication.

12. The method of claim 11 wherein the estimated line shift velocities are generated by using the result of the intermediate step and performing matrix/vector transposition, multiplication, and division.

13. An apparatus for electronically processing a television signal image containing a plurality of original lines of pixels to generate one or more intermediate lines of pixels lying intermediate said original lines, said apparatus comprising:

(a) means for storing said original lines or pixels,
    (b) means for estimating line shift velocities for pixels along said intermediate lines, the velocities being derived from surrounding pixels on said original lines,
    (c) means for using said estimated line shift velocities to access the addressable memory and shift pixels from said original lines,
    (d) means for generating the characteristics of pixels along said intermediate lines from the characteristics of said pixels shifted by said line shift velocities, and
    (e) means for displaying or storing said original and intermediate lines of pixels.

14. The apparatus of claim 13 wherein said characteristics include intensity.

15. The apparatus of claim 14 wherein the means in part (d) includes for each said pixel along a said intermediate line averaging the intensities of at least two said pixels shifted by said line shift velocities from original lines surrounding said intermediate line.

16. The apparatus of claim 13 wherein said image is a color television image, and said characteristics include luminance and chrominance components.

17. The apparatus of claim 16 wherein said estimated line shift velocities are derived from luminance and not chrominance values.

18. The apparatus of claim 13 wherein said line shift velocities for said intermediate line are based only on pixels in adjacent original lines.

19. The apparatus of claim 18 wherein the pixels in adjacent original lines are those in a segment surrounding the intermediate line for each velocity that is being determined.

20. The apparatus of claim 13 wherein the estimated line shift velocity is representative of the separation of an image feature along the direction of the lines.

21. The apparatus of claim 13 wherein said image is a television image.

22. The apparatus of claim 13 wherein said means for estimating includes finite impulse response (FIR) filters in parallel.

23. The apparatus of claim 13 wherein an intermediate result is generated before the line shift velocities are estimated, generating the intermediate result includes matrix/vector transposition, inversion, and multiplication.

24. The apparatus of claim 23 wherein the estimated line shift velocities are generated by using the result of the intermediate step and performing matrix/vector transposition, multiplication, and division.

25. An apparatus for electronically processing a television signal image containing a plurality of original lines of pixels to generate one or more intermediate lines of pixels lying intermediate said original lines, said apparatus comprising:

an addressable memory for storage of two said original lines of pixels, said two original lines of pixels bracketing a said intermediate line, filter means for estimating, from a window of samples surrounding each pixel along said intermediate line, a set of signal parameters for each pixel along said intermediate line, said set of signal parameters being an intermediate result needed to determine line shift velocity of pixels along said intermediate line, product finding means and a processor arrangement for determining said line shift velocity for each said pixel along said intermediate line, memory selector means for locating and shifting, based upon said line shift velocity, pixels from said two original lines of pixels contained in said addressable memory, and an averaging circuit for determining the intensity of each said pixel along said intermediate line.

26. The apparatus of claim 25 wherein the filter arrangement comprises five two-dimensional filters.

27. The apparatus of claim 26 wherein the transfer function of each of the filters corresponds to the entries of the matrix $(A^TA)^{-1}A^T$ where A is a matrix of two-dimensional second-order algebraic polynomials.

* * * * *